United States Patent
Wason

(10) Patent No.: US 10,108,614 B2
(45) Date of Patent: Oct. 23, 2018

(54) DOCUMENT HANDLING IN A WEB APPLICATION

(71) Applicant: International Business Machines Corporation, Armonk, NY (US)

(72) Inventor: James R. Wason, Tuxedo, NY (US)

(73) Assignee: International Business Machines Corporation, Armonk, NY (US)

( * ) Notice: Subject to any disclaimer, the term of this patent is extended or adjusted under 35 U.S.C. 154(b) by 966 days.

(21) Appl. No.: 14/457,608

(22) Filed: Aug. 12, 2014

(65) Prior Publication Data

US 2014/0365497 A1 Dec. 11, 2014

Related U.S. Application Data

(62) Division of application No. 12/607,529, filed on Oct. 28, 2009, now Pat. No. 8,826,142, which is a division of application No. 10/157,263, filed on May 29, 2002, now Pat. No. 7,613,994.

(51) Int. Cl.
*G06F 17/30* (2006.01)
*G06F 21/00* (2013.01)
*G06F 21/62* (2013.01)

(52) U.S. Cl.
CPC .. *G06F 17/30011* (2013.01); *G06F 17/30312* (2013.01); *G06F 17/30315* (2013.01); *G06F 17/30905* (2013.01); *G06F 21/00* (2013.01); *G06F 21/6227* (2013.01)

(58) Field of Classification Search
CPC .................................................. G06F 17/30011
See application file for complete search history.

(56) References Cited

U.S. PATENT DOCUMENTS

| | | | |
|---|---|---|---|
| 5,432,925 A | 7/1995 | Abraham et al. |
| 5,467,448 A | 11/1995 | Hilton et al. |
| 5,664,109 A | 9/1997 | Johnson et al. |
| 5,832,268 A | 11/1998 | Anderson et al. |
| 5,802,529 A | 12/1998 | Nakatsuyama et al. |
| 6,006,288 A | 12/1999 | McIntyre et al. |
| 6,154,756 A | 11/2000 | Hearn et al. |
| 6,418,400 B1 | 7/2002 | Webber |

(Continued)

OTHER PUBLICATIONS

The Unix 'Find' Command p. 5, Published by WC3 on Sep. 22, 2001.

*Primary Examiner* — William Bashore
*Assistant Examiner* — Nathan Shrewsbury
(74) *Attorney, Agent, or Firm* — Scully, Scott, Murphy & Presser, P.C.; Christopher McLane, Esq.

(57) ABSTRACT

A unique document handling facility on the scale of a Lotus Notes document. Preferably, the documents are stored in a relational database and served-up using Java servlets, with provisions for handling document content and group level security.

The preferred implementation of the invention provides several specific features: (1) Presentation and control of heterogeneous document content through the service of the Enterprise Application Development Platform, (2) An efficient scheme for group level and user level security, (3) Presentation of heterogeneous document types, (4) Presentation of heterogeneous data types in the document, (5) A method to externalize definition of keyword selections, and (6) The ability to present document fields in any order, regardless of whether they originate in the head or body of the underlying document.

6 Claims, 14 Drawing Sheets

(56) References Cited

U.S. PATENT DOCUMENTS

| | | | |
|---|---|---|---|
| 6,424,980 B1 * | 7/2002 | Iizuka | G06F 17/30569 |
| | | | 707/999.003 |
| 6,704,736 B1 | 3/2004 | Rys et al. | |
| 6,829,606 B2 | 12/2004 | Ripley | |
| 6,850,922 B1 | 2/2005 | Wason | |
| 6,857,103 B1 | 2/2005 | Wason | |
| 6,915,308 B1 | 7/2005 | Evans et al. | |
| 6,938,260 B1 | 8/2005 | Wason | |
| 7,086,067 B1 | 8/2006 | Wason | |
| 7,237,191 B1 * | 6/2007 | Sulistio | G06F 17/30926 |
| | | | 707/999.002 |
| 7,380,120 B1 | 5/2008 | Garcia | |
| 7,568,152 B1 | 7/2009 | Wason | |
| 2001/0039622 A1 | 11/2001 | Hitz et al. | |
| 2002/0019936 A1 | 2/2002 | Hitz et al. | |
| 2002/0052862 A1 | 5/2002 | Scott et al. | |
| 2002/0077939 A1 | 6/2002 | Nicastro et al. | |
| 2002/0129012 A1 * | 9/2002 | Green | G06F 17/30616 |
| 2002/0156792 A1 | 10/2002 | Gombocz et al. | |
| 2002/0161603 A1 | 10/2002 | Gonzales | |
| 2002/0178271 A1 | 11/2002 | Graham et al. | |
| 2002/0184398 A1 | 12/2002 | Orenshteyn | |
| 2003/0144988 A1 | 7/2003 | Nareddy et al. | |
| 2005/0289166 A1 | 12/2005 | Stanley et al. | |
| 2006/0059253 A1 | 3/2006 | Goodman et al. | |
| 2008/0034205 A1 | 2/2008 | Alain et al. | |
| 2010/0049773 A1 | 2/2010 | Wason | |

\* cited by examiner

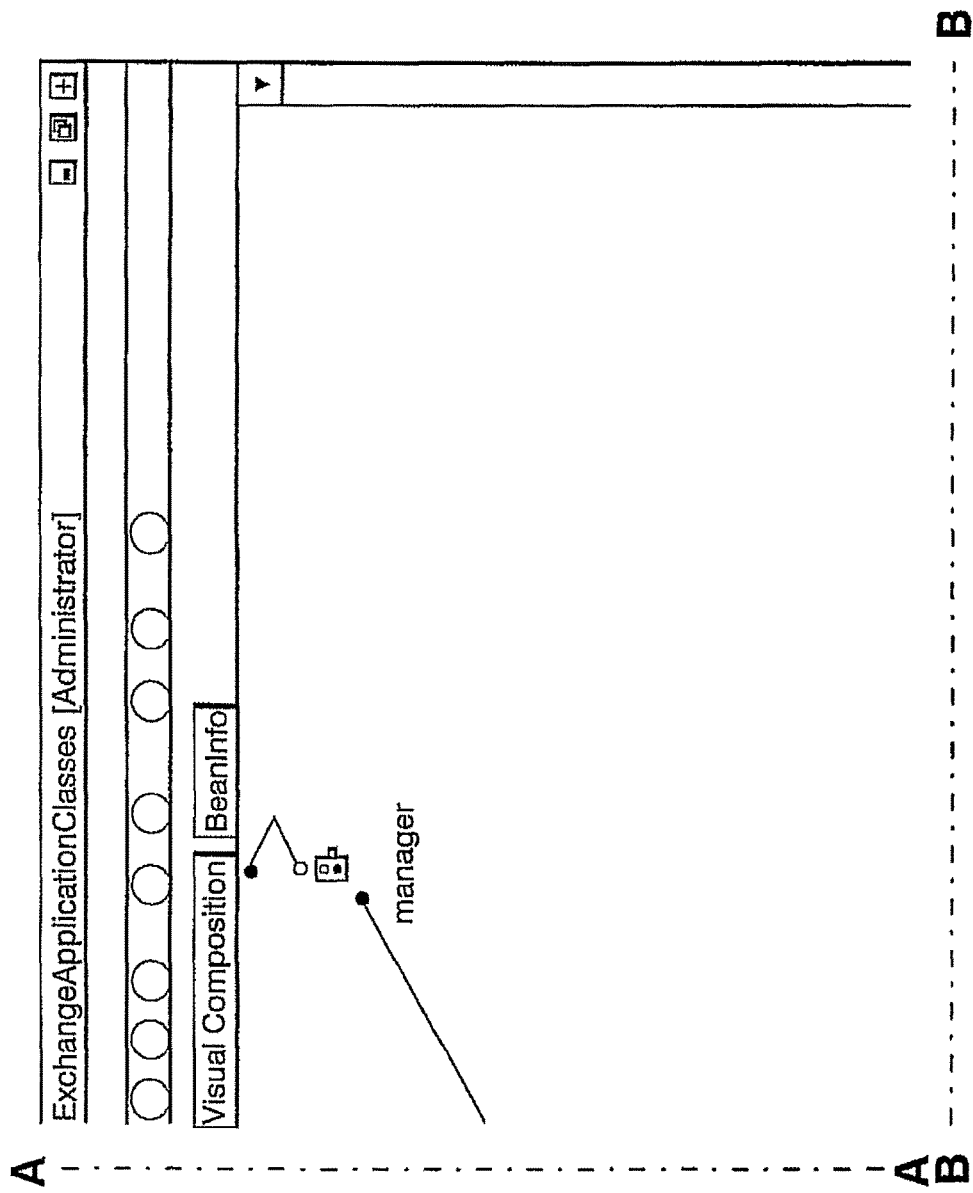

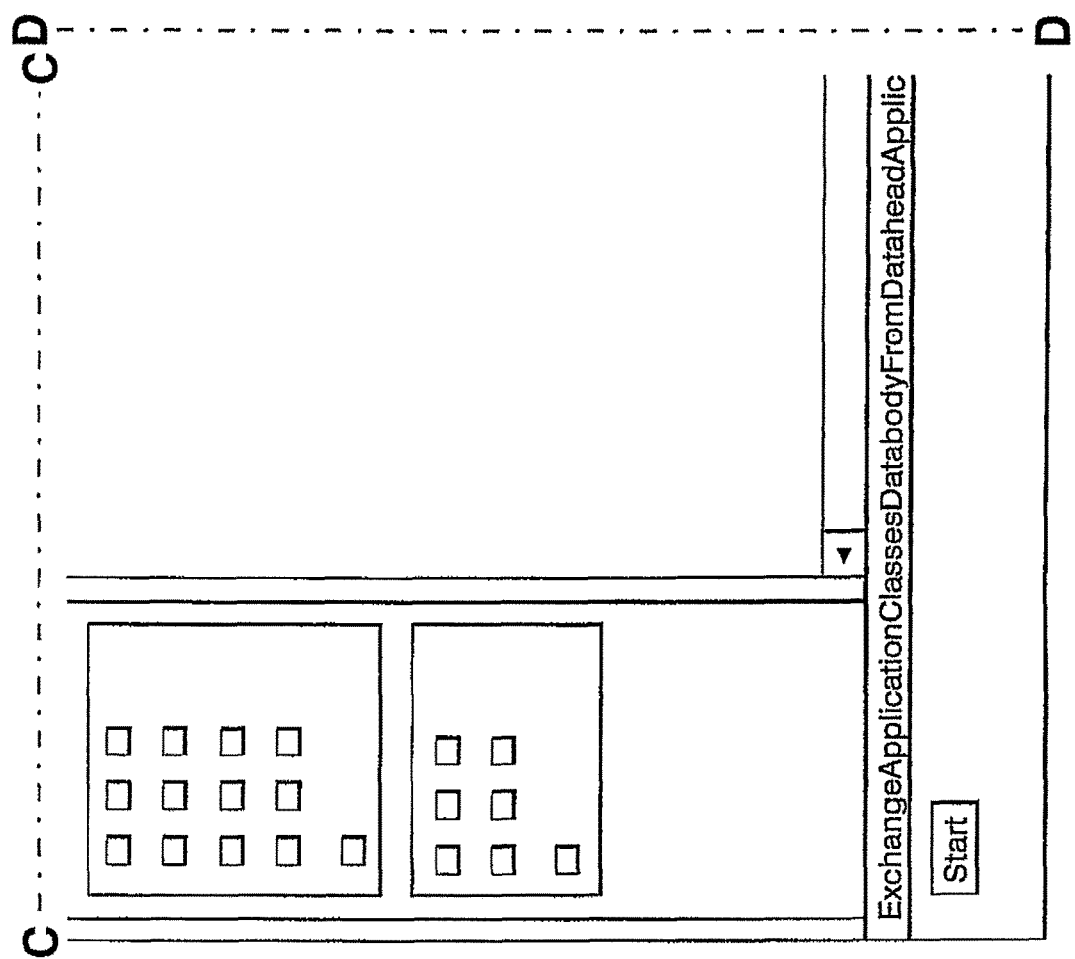

DOCUMENT HANDLING IN A WEB APPLICATION

CROSS REFERENCE TO RELATED APPLICATIONS

This application is a divisional of patent application Ser. No. 12/607,529, filed Oct. 28, 2009, which is a divisional of patent application Ser. No. 10/157,263, filed May 29, 2002, now U.S. Pat. No. 7,613,994. The disclosures of patent application Ser. Nos. 12/607,529 and 10/157,263 are hereby incorporated herein by reference in their entireties.

BACKGROUND OF THE INVENTION

Field of the Invention

This invention generally relates to managing web content; and more specifically, to document handling in a web application.

Background Art

Over the last several years, the amount of information available over the World Wide Web has grown enormously, and indeed, many individual web sites now provide a vast amount of information. As a result, for many web sites, updating the information available at the site and managing the presentation of that information have become very complex, time consuming and difficult tasks.

Lotus Notes is one application that is often used very successfully to manage web content. Lotus Notes does this by organizing web content into documents, which can then be modified, updated and presented in various way. Other applications, such as a DB2/WebSphere application, may also be used to manage the content of a web site, particularly those having very large amounts of data. There are, however, some difficulties or problems with these other applications.

One problem is that some attractive features of Lotus Notes document handling are not readily available in an implementation based on a relational database as the datastore (for example a DB2/WebSphere application). This includes the ability to handle heterogeneous data content, and the ability to restrict read or edit access to the document by user or group.

Another problem is that the same application may want to present several types of documents, and the definition of these documents may change over time (an existing document type may change its content definition, or a new document type may be added). It is very expensive to redeploy a change in database or application design each time this happens.

In a similar way, security definitions may change over time. It is a problem if these changes require changes to code or database design.

Some of the fields in a document may represent selections from a predetermined set of values (these types of fields are sometimes referred to as keywords or codes). However, the choice of selections may vary over time, and introduction of a new document type may introduce an entirely new set of keyword fields. Again, there is a problem if the application needs to be redeployed each time a keyword selection changes.

SUMMARY OF THE INVENTION

An object of this invention is to provide an improved method and system for document handling in a web application.

Another object of the invention is to provide a flexible document handling facility for documents on the scale of a Lotus Notes document, storing the documents in a relational database and serving them up using Java servlets; with provisions for handling heterogeneous document content, and user and group level security.

A further object of the present invention is to present and control heterogeneous document content through the services of the Enterprise Application Development Platform.

Another object of the invention is to provide an efficient scheme for group level and user level security for document handling in a web application.

An object of this invention is to improve procedures for presenting heterogeneous document types.

Another object of the present invention is to provide an improved procedure for presenting heterogeneous data types in documents.

A further object of the invention is to provide a method to externalize the definition of keyword selections.

An object of this invention is to present document fields in any order, regardless of whether they originate in the head or body of the underlying document.

These and other objectives are attained with the unique document handling facility disclosed herein. This facility is on the scale of a Lotus Notes document; and preferably, the documents are stored in a relational database and served-up using Java servelets, with provisions for handling document content and group level security.

The preferred implementation of the invention provides several specific features.

1. Presentation and Control of Heterogeneous Document Content Through the Services of the Enterprise Application Development Platform.

A document is defined as a complex object structure, using the techniques of the EADP disclosed in patent application Ser. No. 09/616,800, filed Jul. 14, 2000; Ser. No. 09/616,809, filed Jul. 14, 2000; Ser. No. 09/616,809, filed Jul. 14, 2000; Ser. No. 09/615,973, filed Jul. 14, 2000; and Ser. No. 09/615,976, filed Jul. 14, 2000 the disclosures of which are incorporated herein by reference. A document header with some control data is defined as the "ruler" in this complex object structure. The majority of the document fields (the "body" fields) are handled as individual instances of subobjects of the document ruler. Each subobject instance has the data for one field of the document, and can accommodate a variety of data types. The definition of what fields go into a particular type of document is held in a second complex object structure of metadata. The metadata header describes the fields for the document header, and the metadata subobject instances describe the data of the document body fields. Instances of documents are created using the corresponding metadata definitions for that document type. New types of documents can be created by adding new instances of the metadata.

The metadata at both the head and body level is tied to the document elements by quick views, so that the application code can easily determine what metadata goes with each field. These EADP provided facilities make it feasible to glue together so many relationships and manage them efficiently at run time.

Presentation of the metadata for update is done through EADP presentation facilities for complex objects. The same presentation facilitates are used to allow the entire complex object structure of the document to be presented in one piece for creation and editing, so that the end user is never aware of the underlying complexity of the document definition.

2. An Efficient Scheme for Group Level and User Level Security.

Documents may range in access restriction from totally unsecured (anyone who can access the application can access the document) to very tightly secured (only individually listed users can access the document). The types of access allowed may be to create, edit, read, or delete the document. The most typical levels of security restriction are by group, rather than by user, and by document type rather than by document.

The preferred embodiment of this invention supports all gradations of security, with optimization of the most typical security patterns.

3. Presentation of Heterogeneous Document Types.

Although all documents are stored within the same set of relational database tables, the selection of columns to present and the titles for those columns are determined by the template definition for that type of document. This invention allows the segregation of documents by document type, and the selection of columns and column titles based on the document type. Within site search, each document type is listed as a separate entry, and offers a unique set of columns for sorting and display. When the databody fields are presented, the data is selected (from one of several columns that can store data, e.g. a text, date or number column) based on the data type defined in the corresponding templbody entry.

Sorting and selection allows the sort columns to be named using the captions for that particular document type (so each document type appears to have a distinct set of sort columns). Fields in the databody can be used for sort and jump to.

4. Presentation of Heterogeneous Data Types in the Document.

Fields within the document may be of various types (text, rich text, date, time, number or keyword). A flexible mechanism is provided to define which data type a particular field should have (based on document type and the field number). A mechanism is provided to store data in a database column of the proper data type for the field. A mechanism (the "aggregate editor") is provided to present the proper field to the user and to map user input to the correct database columns.

5. A Method to Externalize Definition of Keyword Selections.

Keyword type fields can be defined for either datahead fields or databody fields. The decision whether or not a field is a keyword and the permitted values is determined by the combination of field name and document type. These definitions are stored in the relational database and can be modified in the deployed application without a need to redeploy.

6. The Ability to Present Document Fields in any Order, Regardless of Whether they Originate in the Head or Body of the Underlying Document.

An aggregate editor type of "focal data" can be used to call in header values to that body field. The sort order of the body fields can be adjusted so that they appear in arbitrary order for presentation and editing.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
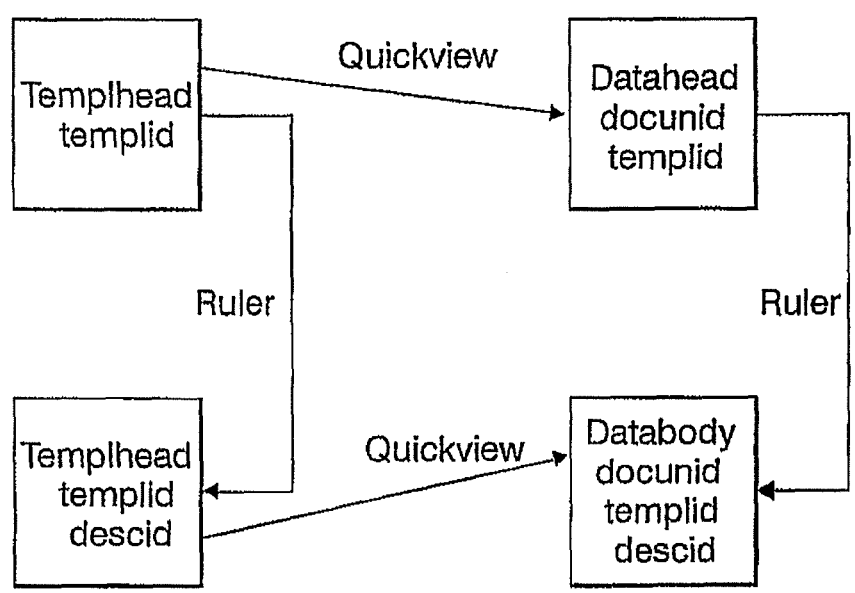
FIG. 1 illustrates a set of relationships used to define a document in a preferred embodiment of the invention.

The present invention, generally, provides a unique document handling facility on the scale of a Lotus Notes document. Preferably, the documents are stored in a relational database and served-up using Java servelets, with provisions for handling document content and group level security.

The preferred implementation of the invention provides several specific features.

1. Presentation and Control of Heterogeneous Document Content Through the Service of the Enterprise Application Development Platform.

A document is defined as a complex object structure, using the techniques of the EADP disclosed in the above-mentioned copending patent application Ser. Nos. 09/616,800; 09/616,809; 09/616,809; 09/615,973; and 09/615,976, the disclosures of all of which are incorporated herein by reference. A document header with some control data is defined as the "ruler" in this complex object structure. The majority of the document fields (the "body" fields) are handled as individual instances of subobjects of the document ruler. Each subobject instance has the data for one field of the document, and can accommodate a variety of data types. The definition of what fields go into a particular type of document is held in a second complex object structure of metadata. The metadata header describes the fields for the document header, and the metadata subobject instances describe the data of the document body fields. Instances of documents are created using the corresponding metadata definitions for that document type. New types of documents can be created by adding new instances of the metadata.

The metadata at both the head and body level is tied to the document elements by quick views, so that the application code can easily determine what metadata goes with each field. These EADP provided facilities make it feasible to glue together so many relationships and manage them efficiently at run time.

Presentation of the metadata for update is done through EADP presentation facilities for complex objects. The same presentation facilitates are used to allow the entire complex object structure of the document to be presented in one piece for creation and editing, so that the end user is never aware of the underlying complexity of the document definition.

2. An Efficient Scheme for Group Level and User Level Security.

Documents may range in access restriction from totally unsecured (anyone who can access the application can access the document) to very tightly secured (only individually listed users can access the document). The types of access allowed may be to create, edit, read, or delete the document. The most typical levels of security restriction are by group, rather than by user, and by document type rather than by document.

The preferred embodiment of this invention supports all gradations of security, with optimization of the most typical security patterns.

3. Presentation of Heterogeneous Document Types.

Although all documents are stored within the same set of relational database tables, the selection of columns to present and the titles for those columns are determined by the template definition for that type of document. This invention allows the segregation of documents by document type, and the selection of columns and column titles based on the document type. Within site search, each document type is listed as a separate entry, and offers a unique set of columns for sorting and display. When the databody fields are presented, the data is selected (from one of several columns that can store data, e.g. a text, date or number column) based on the data type defined in the corresponding templbody entry.

Sorting and selection allows the sort columns to be named using the captions for that particular document type (so each document type appears to have a distinct set of sort columns). Fields in the databody can be used for sort and jump to.

4. Presentation of Heterogeneous Data Types in the Document.

Fields within the document may be of various types (text, rich text, date, time, number or keyword). A flexible mechanism is provided to define which data type a particular field should have (based on document type and the field number). A mechanism is provided to store data in a database column of the proper data type for the field. A mechanism (the 'aggregate editor") is provided to present the proper field to the user and to map user input to the correct database columns.

5. A Method to Externalize Definition of Keyword Selections.

Keyword type fields can be defined for either datahead fields or databody fields. The decision whether or not a field is a keyword and the permitted values is determined by the combination of field name and document type. These definitions are stored in the relational database and can be modified in the deployed application without a need to redeploy.

6. The Ability to Present Document Fields in any Order, Regardless of Whether they Originate in the Head or Body of the Underlying Document.

An aggregate editor type of "focal data" can be used to call in header values to that body field. The sort order of the body fields can be adjusted so that they appear in arbitrary order for presentation and editing.

To achieve these features, document support is provided within the context of the Enterprise Application Development Platform, which is discussed in the above-identified copending patent application Ser. Nos. 09/616,800; 09/616,809; 09/616,809; 09/615,973; and 09/615,976.

The above-identified features of the preferred embodiment of the invention are discussed in greater detail below.

Document Definition

Each document is defined by the set of relationships shown in FIG. 1. With reference to this Figure, each template defining a document is a complex object including templhead and its related templbody elements (these all have the same templid). Documents for that template have the same templid in both datahead and databody. The datahead and its related databody elements form a complex object bound by a common docunid. Each databody element is matched with a templbody with the same templid and descid. These relationships are mapped to ruler→subobject and quick view (qvsource→qvtarget) relationships within EADP. This facilitates the navigation through the data, and it allows data from the template (for example the captions for the fields) to be accessed as quick view data.

When a document is opened, the natural way to see it is as an entire document (the datahead and databody fields presented together). EADP provides this function through complex object support (the databody is a subobject of the datahead, and drilling down to the databody from the datahead will show all the databody elements, along with the datahead elements as focal data). However, in order to make this function more intuitive, some enhancements have been made for document processing. In the preferred embodiment, this invention utilizes a feature referred to as a "primary subobject" (here databody is considered a primary subobject of datahead). When a list of dataheads is presented, and one of the rows is selected to open, a check is made to see if the object has a primary subobject. If so, instead of the row being opened, the list panel for its primary subobject (in this case the entire document) is opened. The datahead fields are presented as focal data at the top of the object, and the databody fields appear in the body of the page.

Both the focal data fields and the databody fields can be edited at the same time. If the primary subobject is being presented, the fields for the focal data are tied directly to the ruler row (in this case the row for the datahead table). Any updates made to the fields are made to that row, which is then committed in the same unit of work as the databody fields. The update for the databody fields as a group makes use of EADP tabular update capability.

Special templbody rows of type "focal data" can be used to reference fields from the header, so that these can be presented within the body of the document rather than at the top.

Document Security

Figure 2:
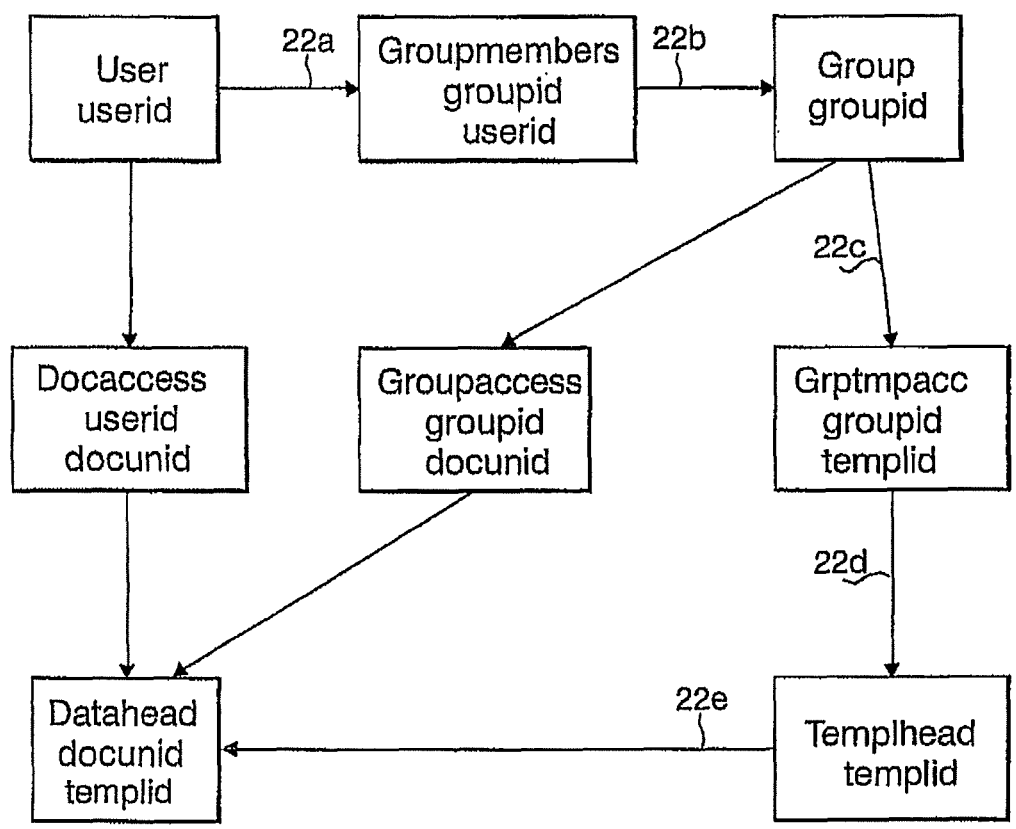
FIG. 2 shows user and group level access restrictions to documents.

User and group level access restrictions to documents is defined in the table shown in FIG. 2. The arrows show the flow to determine if a user can look at a particular document. The 22a, 22b, 22c, 22d and 22d path user→group→template→document represents the most typical and efficient path (it restricts by group and document type). This can be achieved with a minimum of database segments required to support the security definition. There is also an option to list a document as unrestricted, and there are some users (typically administrators) who can look at any document regardless of security definitions.

All database access within EADP goes through a secureSelect method which can be redefined to add security restrictions. For documents, this method is redefined to add the security conditions indicated in FIG. 2. The method generates a sql statement which does a union of the variants of the original selection (which may have selected a subset of documents based on document type (templid) and additional criteria) with the selection for a given path from user to document added.

Heterogeneous Document Types

Figure 3:
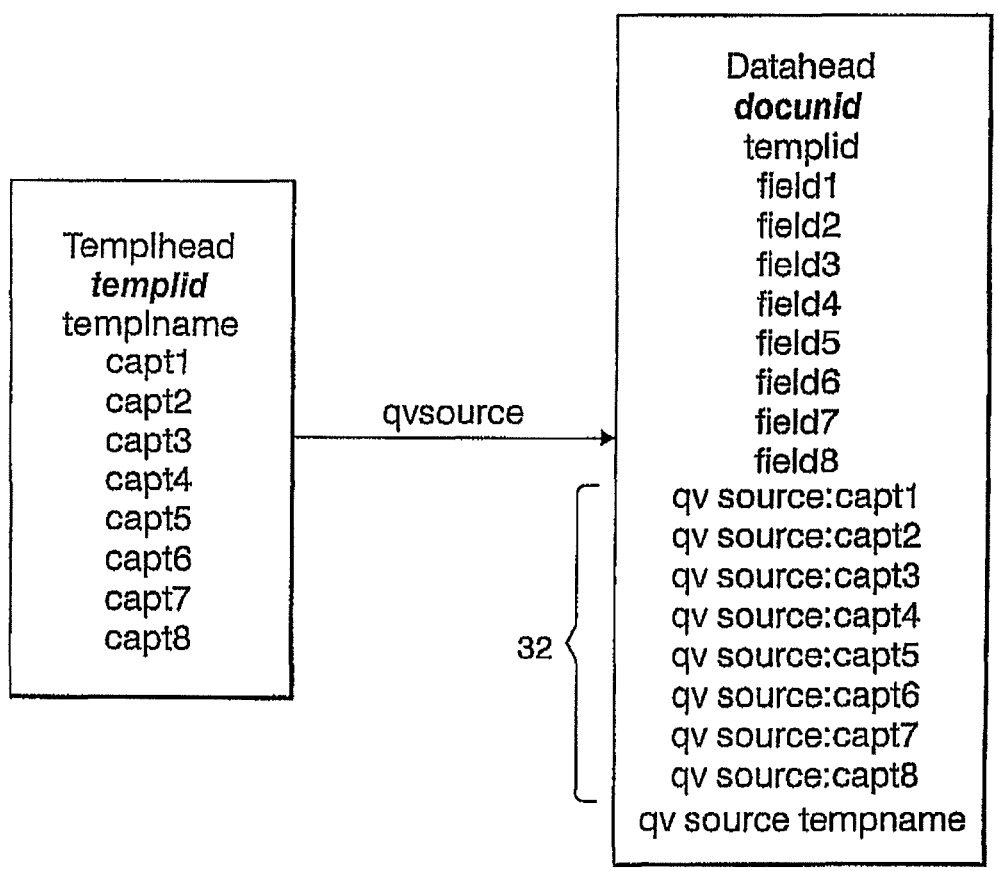
FIG. 3 shows how data may be linked between a document and its corresponding template.

Data between the document and its corresponding template is linked as shown in FIG. 3. Here, the fields designated at 32 are derived (quick view) fields added within EADP. The caption fields (capt1 etc.) are used to give the external name for the corresponding column in the datahead (so that the external names for the columns may vary by document type). If the field is not used for that document type, its corresponding caption is set to a single blank.

External column names in EADP are set using the external names dictionary editor in the database definition class. For the field1 through field8 fields, the external name is set to ?qvsource:capt1 . . . ?qvsource:capt8. Within EADPDA-Manager, the external column names method recognizes the leading question mark as a signal that it should derive the rest of the column name by using the getStringValue method for the rest of the external column name after the question mark. For example, the external column name for field1 from the dictionary is ?qvsource:capt1. This then is used to find the "real" external column name by using getString Value passing qvsource:capt1 as the column name. The result is the caption for that field from the template.

EADP site search provides a list of tables that can be searched. Each document type is listed separately (as Document plus the template name). The list of document types to be presented for each user is derived from the user-→group→template relationships discussed above.

Figure 4:
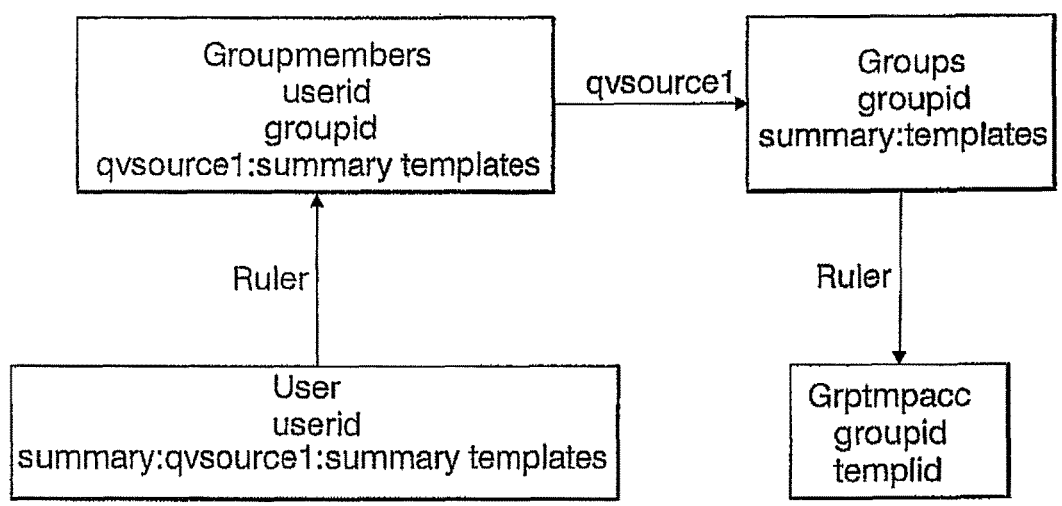
FIG. 4 illustrates relationships among various functions that may be used in the invention.

With reference to FIG. 4, the summary column added to users contains all the templates that user can access. This is used to set up a list of the document types available to that user (this allows different user groups to see distinct slices of the data). When the user initiates an application session, a user row is created that includes the summary data for the available template ids. This is used to build a list of default selection strings (e.g. t1.templid=1) which are used to select documents of a particular type. The names for the sort columns for a particular type of document are determined from the templhead and templbody rows for that template id. The names presented are capt1 through capt8 from the templid if the value is not blank (a column with a blank caption name is assumed to be unused for that document type) and the descript field from the templbody. Not all templbody fields are presented as sort columns for the document, only the ones which are numeric or date.

Site search is presented on the Web in two select lists. The first has the tables as entries—the external name is the table name, and the internal value is a string that has the internal name for the table, and a separator delimited string of the external and internal names for each sort column. The second option list has the sort columns for a particular table; the external value for each entry is the external name for the sort column, and the internal value is the internal column name. This scheme is enhanced for documents by listing each document type as an individual table entry (the template name is appended to the document table external name to distinguish the document type). The sort columns for each document type are derived as described above; the databody sort fields are prefixed with the descid for that databody to indicate which databody entry for the datahead is to be used.

The same scheme is used for the list form for documents. When this list is prepared, there is always a default selection string (e.g, t1.templid=1) assigned to the data manager for that list. This is added to any other selections to ensure that all the documents reported in the list are of the same type. If the selection returns no rows, the external name for columns cannot be derived using the scheme described above (by using the quick view relationship from the row to the matching templhead row). In this case, the templhead row is found using the default select string, and it is used to find the captions to give the external column names. These templhead rows are cached in a static field in the application class for the documents (the DataheadApplicationClass) so that they do not have to be retrieved over and over again.

Within the site search or list, a "jump to" capability is provided. This adds to the selection criteria the "jump to" value for the selected sort column. This is enhanced for documents to allow jump to work for databody fields as well as datahead fields.

The way this works is that within the secureSelect method, any databody fields used for sort or selection are appended to the base selection for the datahead fields. Since the databody fields are added at the end of the selection, they do not interfere with the persistence code used to handle the result set (which expect a certain number of datahead fields to be the result of the selection).

Heterogeneous Data Types

The databody table contains three fields to hold data, one text, one numeric, and one date. Only one of these fields is populated for any given databody entry (the text field for data types of text and rich text, the date field for data types of date and time, and the number field for numeric and keyword data). These three internal fields need to be mapped to one field (possibly with different presentation characteristics) for user interaction. This is preferably accomplished by the use of a feature referred to as aggregate editor and aggregate columns.

Figures 1, 5:
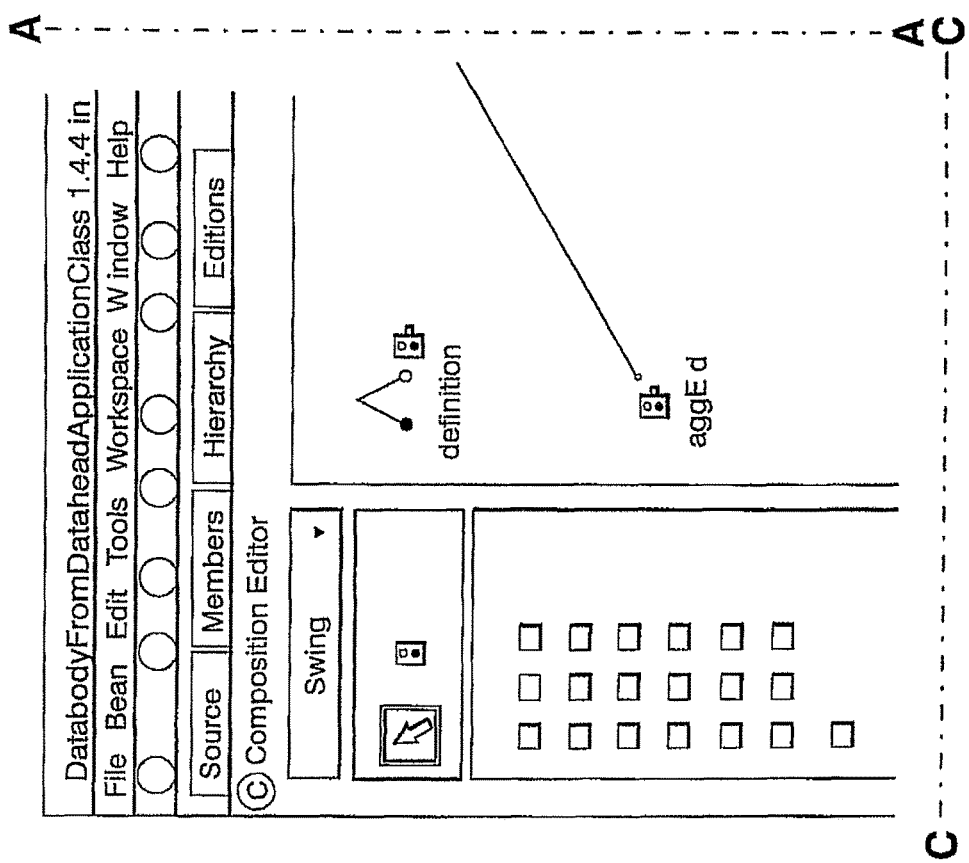
FIG. 5 is a view of a screen showing an aggregate editor function that may be used.
Figures 4, 5:
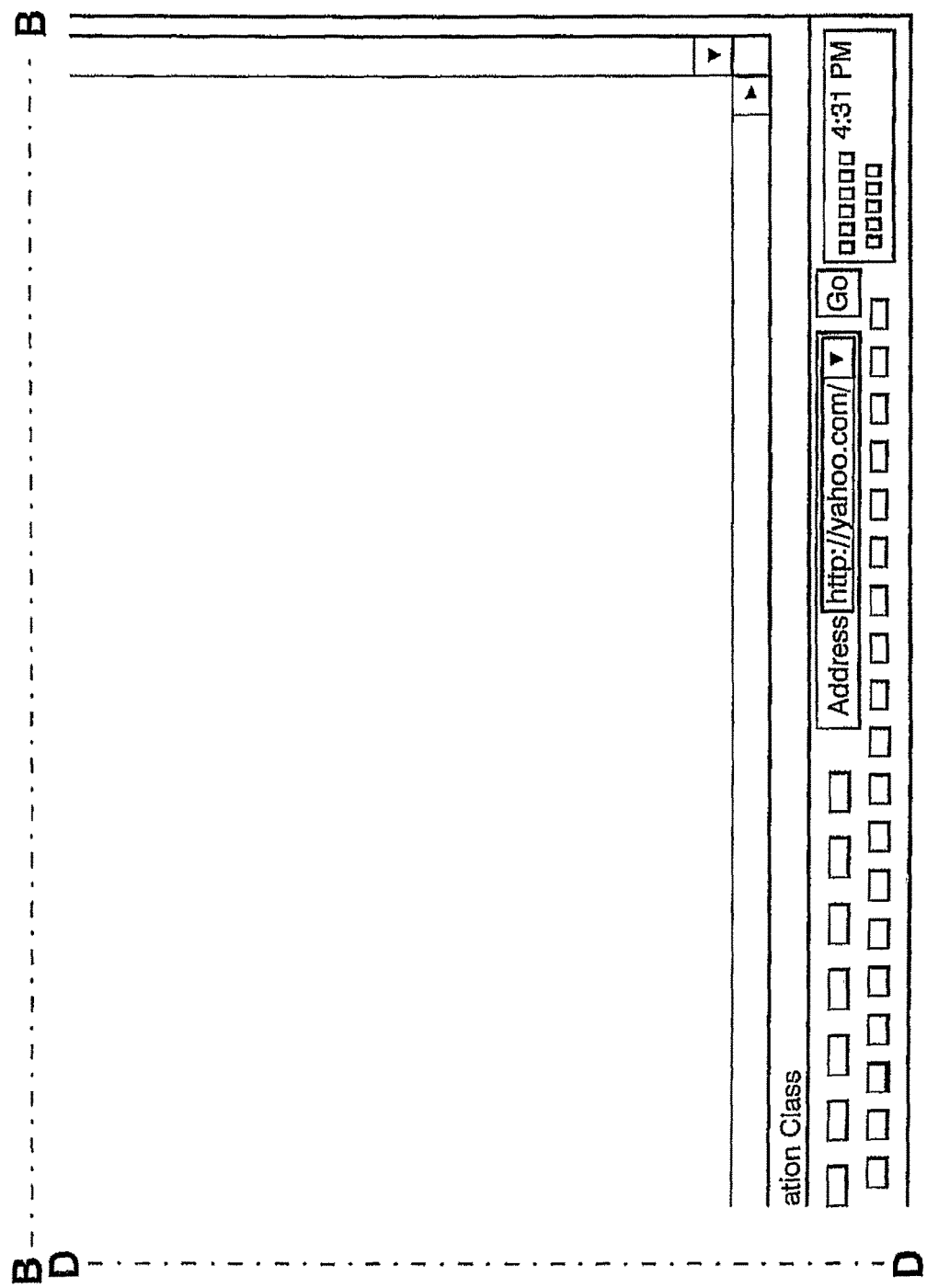
Figures 1, 6:
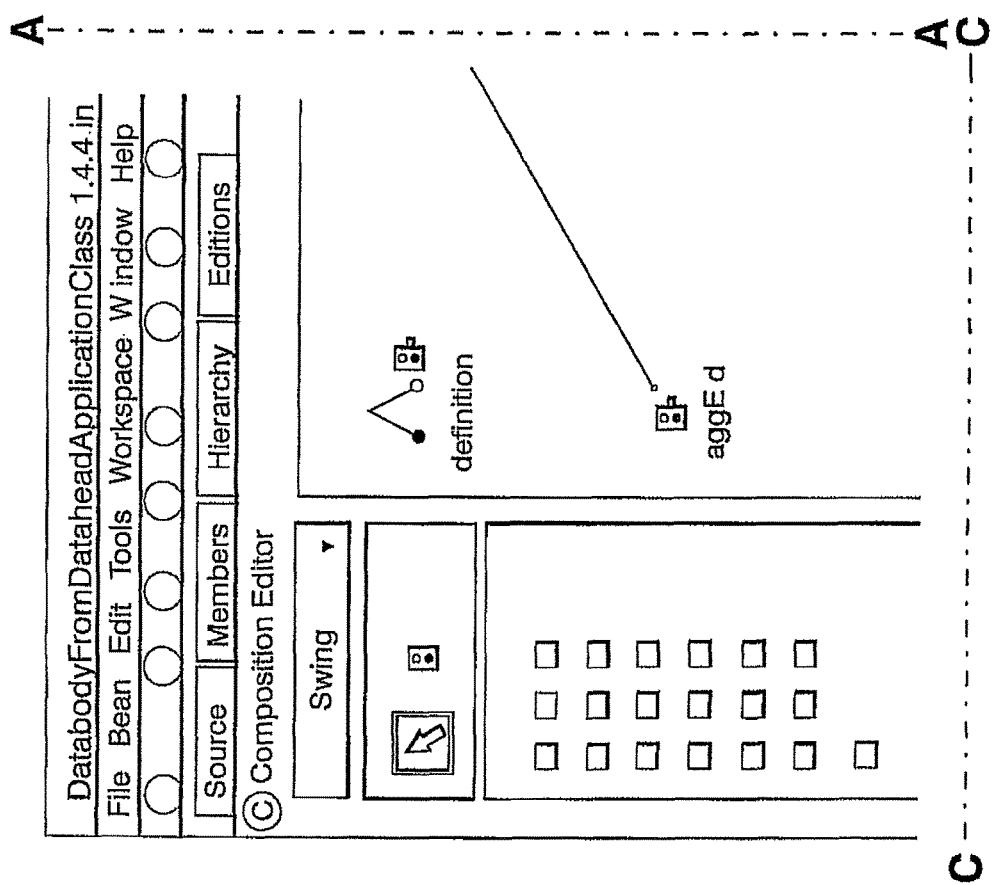
FIG. 6 is a view of a screen showing a list of manager functions.
Figures 2, 6:
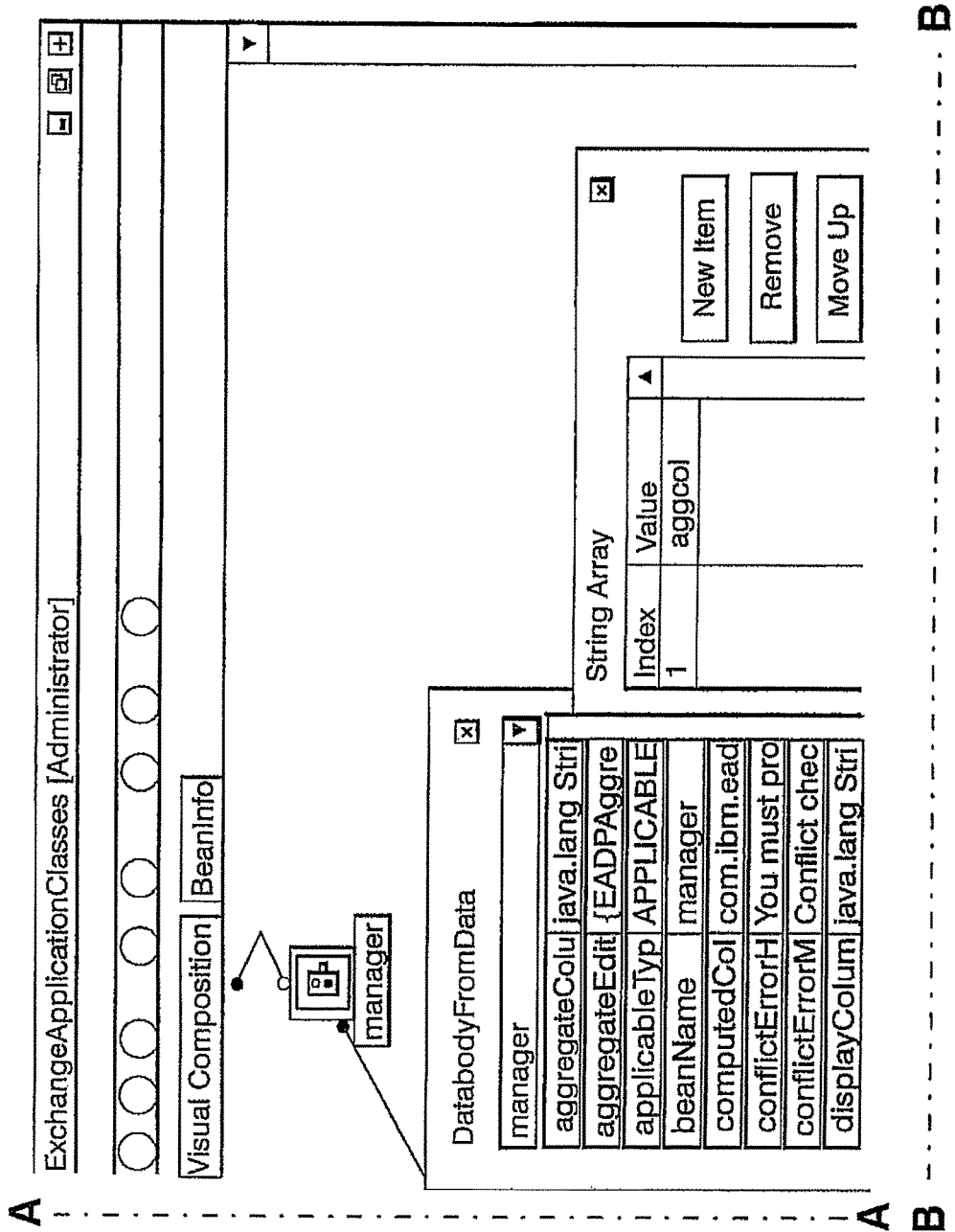
Figures 3, 6:
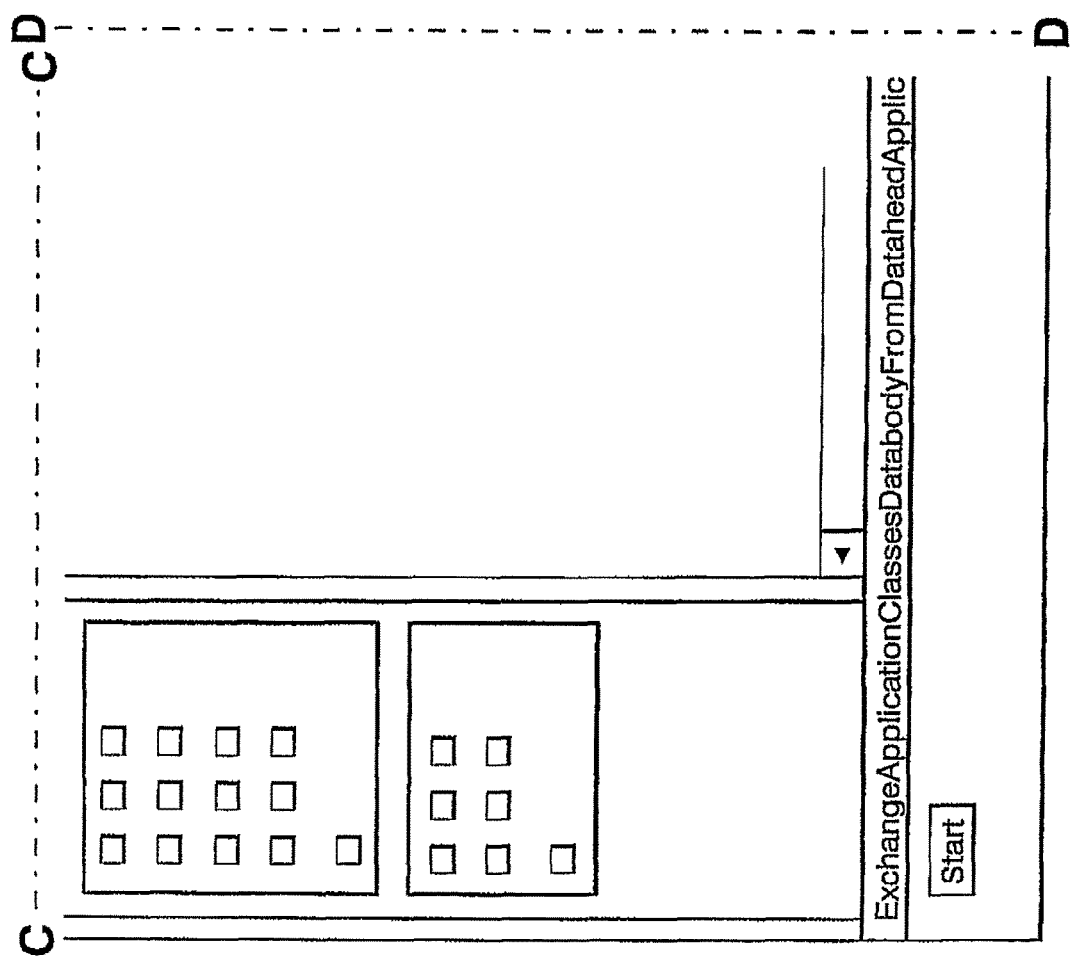
Figures 4, 6:
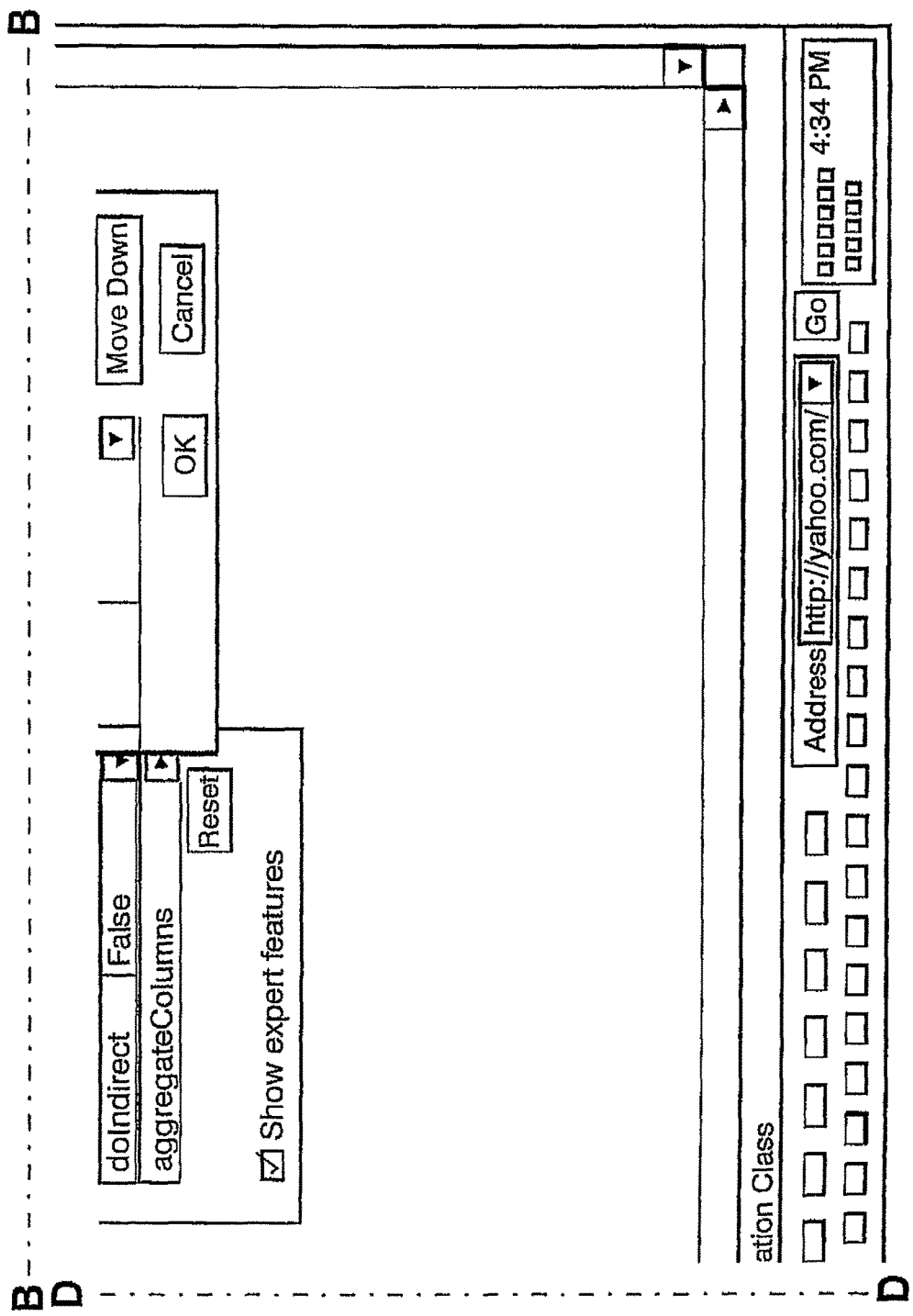

With EADP, a new class EADPAggregateEditor is added, and the EADPDAManager has a property of this type. To customize the aggregate editor, a child of EADPAggregateEditor (in this case the DatabodyAggregateEditor) is created. Within VisualAge, a bean of type DataheadAggregateEditor is added to the application class for the document body (DatabodyFromDataheadApplicationClass) and is connected to the aggregate editor property of the data manager beans, as represented in FIG. 5. Also, as represented in FIG. 6, a new column (aggcol) is defined as an aggregate column by adding the aggregatecolumn array.

This column is also added as a display column. When the columns for a row are processed, each column to process (indicated by the display column array) is checked to see if it is an aggregate column (determined by its presence in the aggregate column array). If so, the row being processed is assigned as the current row in the aggregate editor. As this happens, the relationships shown in FIG. 7 among templbody, databody and templkeywords are used to set up the editor.

Figure 7:
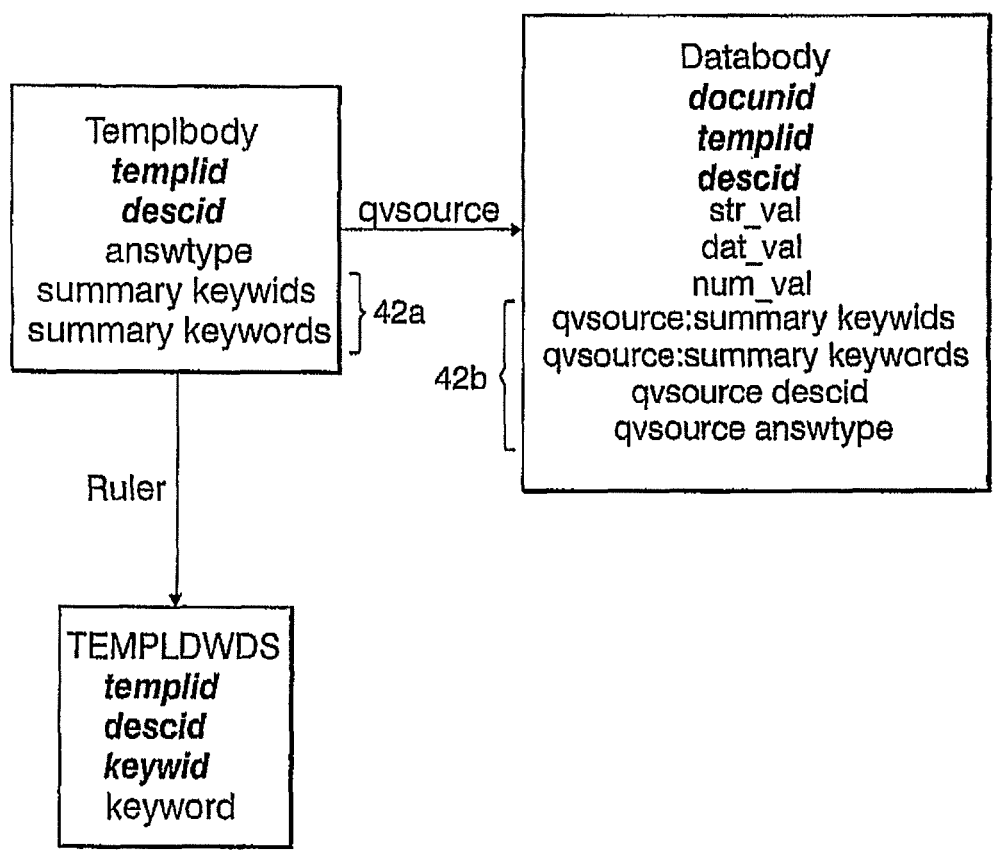
FIG. 7 is a diagram illustrating relationships among several functions that may be used in the practice of the invention.

In the diagram of FIG. 7, key fields are in italics. The field designated as 42a and 42b are summary and quick view columns defined within EADP (they are derived fields not included in the actual database tables). The net effect of these derived fields is that all the interesting data from the template side is available within the databody row that is assigned to the aggregate editor. The answtype field is used to determine the type (text, date, time, number, rich text, or keyword). If the type is keyword, the aggregate editor is set to show that the field has discrete values, and the summary columns of key word ids and keyword text are used to set up a list of the internal and matching external values for each keyword.

When data is displayed in EADP, it is obtained using the getString Value method on the row (EADPPersistentObject) passing the column name. This method checks to see if the column is an aggregate column, and assigns the row as the current row. It then calls the getString Value method on the aggregate editor. This method is redefined for DatabodyAggregateEditor to check the datatype, to get the data from the appropriate internal column, and to do any data conversions based on the data type (for example, both time and date columns get their data from the dat_val column, which is a date time stamp in the database, but the date format fields drop off the time portion for presentation and update). Keyword fields are stored in the num_val field (the number matches the keywid for the selected value). This number is matched against the list of internal values and the corresponding external value is displayed.

Data is assigned using the setStringValue method on the row, which reverses the procedure described above. Based on the data type, the data is converted from string to the appropriate internal data type, and assigned to the appropriate internal column.

When EADP web processing is preparing a form for edit mode, it checks each field to see if it has discrete values. The method called is the isBft method on ADPDAManager, which takes as parameters the name of the column to be checked and the current row. If the column is an aggregate column, the passed row is assigned as the current row to the aggregate editor, and the editor is then used to determine if there are discrete values, and if so, what those values are. For the databody aggregate editor, the values presented are the list of external values derived from the summary column for keywords from the templkwds segments for the templbody for the databody row.

Datahead fields can also be selectively chosen to act as keywords, but the implementation is different. There are eight text fields in the datahead which may be defined to be keywords based on the document type (templid) and the field name. A special business factor table, the DataheadKwdValues bif, is used to describe the keyword values. This bft has two columns. The key column contains the templid and fieldname for the field to be defined as a keyword. The second column contains the list of permitted values, separated by commas. The datahead aggregate editor uses this when the is Bft method is called to set up the list of external values to present for editing that field.

Externalization of Keyword Definition

For databody keywords, the definition of whether the field is a keyword and the permitted values are defined by entries in the templbody and tempkwd tables. These tables can be accessed by the application administrator through the standard EADP web presentation. The datahead keywords are in a business factor table, which can be accessed and modified over the Web using dynabean technology. Datahead keywords can also be defined to be multivalued. In this case, a special template is used for presentation which presents a multiple selection list. The selected values are collected into a single string with a delimiter to break up the values, and this is what is stored in the database. If the multiple value is presented read-only, it is presented as a table of the values; if it is presented for update, a multiple select list is created with all the possible choices, with the ones from the database shown as selected.

The aggregate editor also allows the possible values to be different based on the current state of the data. This is accomplished by use of the EADPStringTree. This is a memory structure of tree nodes, where each node has a value, an external name, and the list of its child nodes. The current value of the data is used to locate a tree node, and its child nodes are used to set up the permitted values for the keyword.

Figure 8:
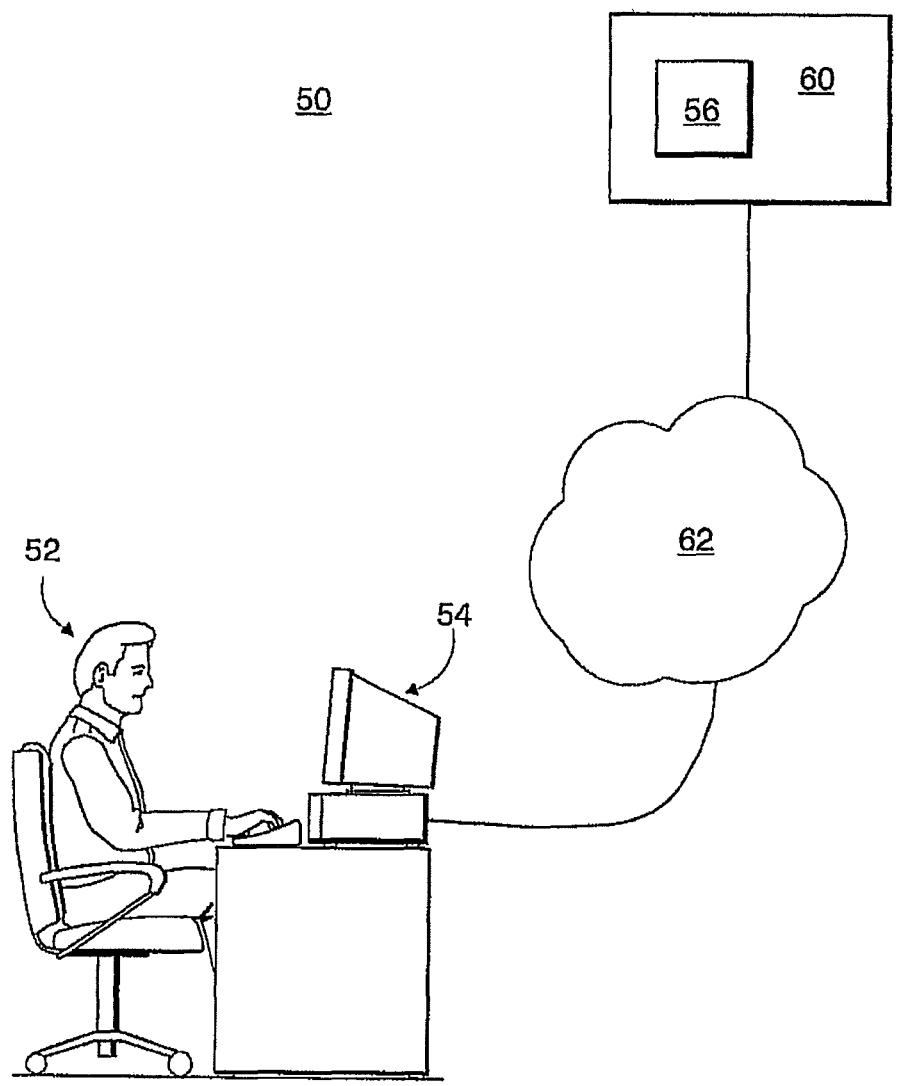
FIG. 8 is a diagram showing a system that may be used to practice the invention.

A string tree is defined by a string, which is stored in the metadata tables so that it can be easily updated. Node entries are delimited by separators of the form string-index-string (e.g. s1s, s2s). The index is used to indicate the levels of the entry in the tree structure. Each entry is comprised of the internal and external values separated by a semicolon. Below-is an example: draft;Save as Draftslsfinal;Publish to the Exchangeslssenddraft;Mail for commentsslsreview;Submit for reviews2spublish;Publish to Press onlys2spublishwire;Publish to Press and sent to Internet Wires2ssls As mentioned above, the present invention is particularly well suited for managing the content of a web site. Any suitable system or apparatus may be used to implement the invention in this way, and FIG. 8 illustrates, an example, system 50 that may be used to practice the invention. More specifically, FIG. 8 shows a user 52 having a computer 54 for accessing an application 56 running on server 60 via the Internet 62. Application 56 may incorporate the document handling techniques described herein. Computer 54, it may be noted, may be a standard personal computer, a notebook computer or a workstation, and the computer includes a central processing unit, a monitor and a mouse or other pointing device.

The preferred embodiment of the invention, as described above, provides a number of important advantages in comparison to other content management systems. For example, the approach of this invention offers a better balance for data distribution within the database, for changes to documents and data definition within the deployed application, and user and group level security.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of presenting heterogeneous document types in a computer system, the method comprising the steps of:
    defining, in a computer system, each of multiple documents as a first complex object structure, each of the documents having a header and a plurality of fields;
    handling, in the computer system, each of the fields of each document as individual instances of subobjects of the document, wherein each subobject instance has data for one field of the document and can accommodate a variety of data types;
    providing, in the computer system, a second, complex object structure holding definitions of what fields go into which ones of the multiple documents, including providing a template having a definition for said each document;
    segregating the documents by document type according to the template definitions; for each document, selecting columns and column titles based on the type of document, including using the definition in the template for said each document to determine the selection of columns from database tables; and
    providing a site search, and listing each document type as a separate entry in the site search.

2. A method according to claim 1, wherein each document has a plurality of databody fields, and the method further comprises the step of, when presenting the databody fields, selecting the data based on the data type defined in a corresponding template entry.

3. A computer system for presenting heterogeneous document types, comprising:
    means for defining each of multiple documents as a first complex object structure, each of the documents having a header and a plurality of fields;
    means for handling each of the fields of each document as individual instances of subobjects of the document, wherein each subobject instance has data for one field of the document and can accommodate a variety of data types;

means for providing a second, complex object structure holding definitions of what fields go into which ones of the multiple documents, including providing a template having a definition for said each document;

means for segregating the documents by document type according to the template definitions;

means for selecting columns and column titles for each document based on the type of document, including using the definition in the template for said each document to determine the selection of columns from database tables; and means providing a site search, and for listing each document type as a separate entry in the site search.

4. A system according to claim 3, wherein each document has a plurality of databody fields, and the system further comprises means for presenting the databody fields and, when presenting the databody fields, for selecting the data based on the data type defined in a corresponding template entry.

5. A program storage device readable by machine, tangibly embodying a program of instructions executable by the machine to perform method steps for presenting heterogeneous document types in a computer system, said method steps comprising:

defining, in a computer system, each of multiple documents as a first complex object structure, each of the documents having a header and a plurality of fields;

handling, in the computer system, each of the fields of each document as individual instances of subobjects of the document, wherein each subobject instance has data for one field of the document and can accommodate a variety of data types;

providing, in the computer system, a second, complex object structure holding definitions of what fields go into which ones of the multiple documents, including providing a template having a definition for said each document;

segregating documents by document type according to the template definitions; for each document, selecting columns and column titles based on the type of document, including using the definition in the template for said each document to determine the selection of columns from database tables; and providing a site search, and listing each document type as a separate entry in the site search.

6. A program storage device according to claim 5, wherein each document has a plurality of databody fields, and the method steps further comprises the step of, when presenting the databody fields, selecting the data based on the data type defined in a corresponding template entry.

* * * * *